United States Patent [19]

Jones

[11] Patent Number: 4,545,458
[45] Date of Patent: Oct. 8, 1985

[54] DRIVE MECHANISM FOR STEERING WHEELS OF VEHICLE

[75] Inventor: Donald D. Jones, Elwood, Ill.

[73] Assignee: Trac 4 Inc., Elwood, Ill.

[21] Appl. No.: 517,223

[22] Filed: Jul. 25, 1983

[51] Int. Cl.⁴ .............................................. B62D 7/10
[52] U.S. Cl. .................... 180/255; 180/238; 180/256; 180/258; 180/265
[58] Field of Search ............... 180/253, 255, 256, 257, 180/258, 265, 237, 238

[56] References Cited

U.S. PATENT DOCUMENTS

| | | | |
|---|---|---|---|
| 1,193,560 | 8/1916 | Kerlin | 180/255 X |
| 1,284,984 | 11/1918 | Barnes | 180/257 |
| 1,309,266 | 7/1919 | Walter | 180/258 X |
| 1,316,918 | 9/1919 | Nogrady | 180/255 |
| 1,379,792 | 5/1921 | Winther | 180/255 |
| 1,396,102 | 11/1921 | Dunham et al. | 180/257 X |
| 1,794,145 | 2/1931 | Bussien | 180/257 |
| 1,981,173 | 11/1934 | Herrington | 180/257 |
| 2,775,307 | 12/1956 | Hill | 180/257 |
| 2,855,063 | 10/1958 | Steinke et al. | 180/257 |
| 3,191,708 | 6/1965 | Simonds et al. | 180/257 |
| 3,605,930 | 9/1971 | Ainsworth | 180/257 |
| 3,759,340 | 9/1973 | Schilter | 180/257 |
| 4,069,887 | 1/1978 | Koepfli | 180/257 |

FOREIGN PATENT DOCUMENTS 969772 12/1950 France .............................. 180/255

Primary Examiner—Joseph F. Peters, Jr.
Assistant Examiner—Charles R. Watts
Attorney, Agent, or Firm—Wood, Dalton, Phillips, Mason & Rowe

[57] ABSTRACT

A drive mechanism for the steering wheels of a vehicle. The drive mechanism includes a housing adapted to be mounted on the frame of the vehicle and a differential gear in the housing adapted to be operatively connected to the drive shaft of the vehicle. A pair of half shafts are provided in the housing which are operatively connected to the differential gear and extend outwardly from the differential gear in opposite directions generally perpendicular to the vehicle drive shaft with at least the inner portions thereof having a common axis. A pair of stub shafts are provided in the housing which are operatively connected to the half shafts and extend outwardly beyond the ends of the half shafts remote from the differential gear generally parallel to and laterally spaced from the outer portions of the half shafts. The drive mechanism also includes a mechanism for accommodating the relative pivotal movement between the stub shafts and at least a portion of the half shafts. With this arrangement the vehicle may be steered while being driven with the drive mechanism.

10 Claims, 6 Drawing Figures

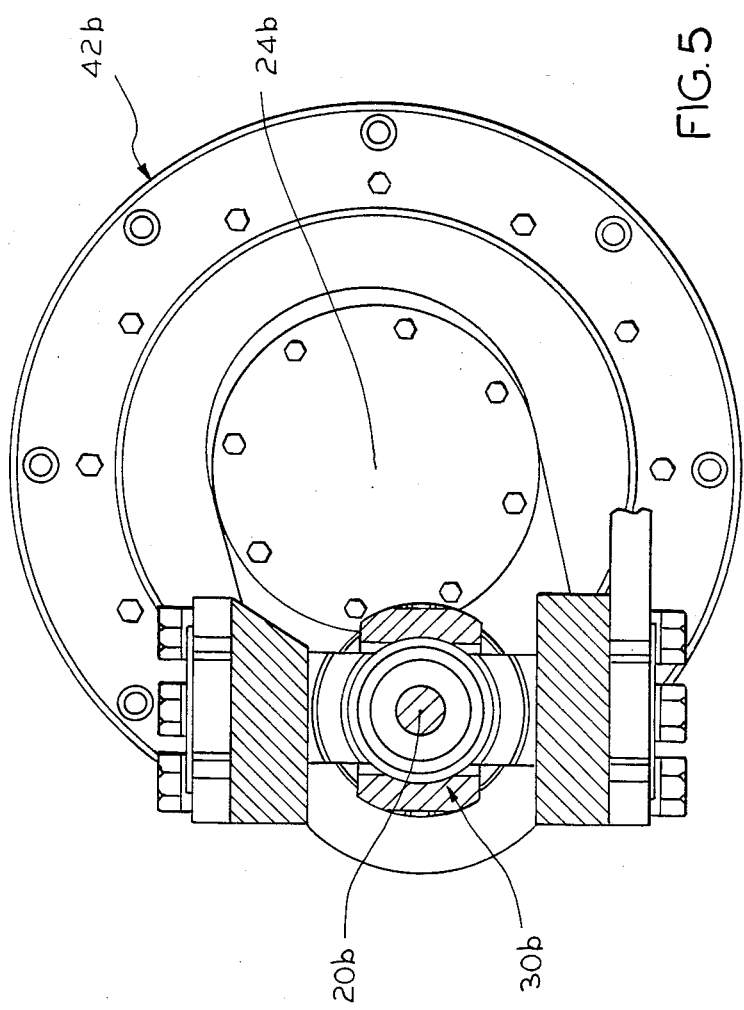

DRIVE MECHANISM FOR STEERING WHEELS OF VEHICLE

BACKGROUND OF THE INVENTION

The present invention relates to a drive mechanism for the steering wheels of a vehicle and, more particularly, to an all wheel drive for an agricultural tractor with front wheel steering.

For several years, it has generally been recognized that all wheel drive for agricultural tractors with front wheel steering has many advantages over conventional two wheel drive tractors. For instance, all wheel drive gives up to 50% better traction and 25 to 30% more pulling power to keep the tractor moving on all kinds of soil and, as a result, it is possible to get more done in less time and to avoid losing time because of soil conditions since it is possible to plow even when the soil is wet. Moreover, because of the increased traction and added pulling power, all wheel drive provides significant savings in increased fuel efficiency, reduced tire wear, and extended tractor life.

Because of the advantages in all wheel drive, conversions are available for conventional two wheel drive tractors. Among the best conversions available are those manufactured and sold by Elwood Manufacturing Company of Elwood, Ill. which are simple to maintain, easy to install, provide good maneuverability with a 35° steer on 30 inch rows, result in less soil compaction because the power on the front wheels eliminates the necessity to load the rear of the tractor with ballast, provide 12° oscillation so all four wheels maintain ground contact all of the time, and give sufficient mid tractor ground clearance to run the tractor over the roughest terrain without damaging the drive line. Despite these advantages, it has remained to provide an all wheel drive conversion with adjustable tread width having a significantly reduced turning radius.

It is therefore an object of the present invention to provide a drive mechanism for the steering wheels of a vehicle which takes full advantage of the many features inherent in prior devices while overcoming the few remaining obstacles to perfecting the design, construction and operation of such devices.

These and other objects, features and advantages of the present invention will become apparent from the following description when considered in connection with the accompanying drawings.

SUMMARY OF THE INVENTION

In general, the objects and advantages of the present invention are met by providing a drive mechanism for the steering wheels of a vehicle having a unique combination of features and components. The drive mechanism includes a housing adapted to be mounted on the frame of the vehicle and a differential gear in the housing adapted to be operatively connected to the drive shaft of the vehicle. A pair of half shafts are provided in the housing operatively connected to the differential gear and extending outwardly from the differential gear in opposite directions generally perpendicular to the vehicle drive shaft with at least the inner portions thereof having a common axis. A pair of stub shafts are provided in the housing operatively connected to the half shafts and extending outwardly beyond the ends of the half shafts remote from the differential gear generally parallel to and laterally spaced from the outer portions of the half shafts. The drive mechanism also includes means for accommodating relative pivotal movement between the stub shafts and at least a portion of the half shafts. With this arrangement, the steering wheels of the vehicle may be steered while being driven with the drive mechanism.

In a preferred embodiment, the half shafts each include a first portion and a second portion. The first portions comprise the inner portions thereof and the second portions comprise the outer portions thereof which are operatively connected to the stub shafts. In addition, the second portions are adapted to pivot relative to the first portions.

Advantageously, a universal joint connects the first and second portions of each of the half shafts. The universal joints comprise at least a portion of the means for accommodating relative pivotal movement between the stub shafts and at least a portion of the half shafts. In this connection, the second portions are adapted to pivot about the universal joints with respect to the first portions.

Other details of the invention include a wheel hub being disposed on the outer end of each stub shaft. The stub shafts then each include a sun gear on the outer end thereof adapted to drive a plurality of stationary planetary gears disposed thereabout. Also, the wheel hubs each include a ring gear driven by the planetary gears affixed thereto.

As will be appreciated, the housing is adapted to be mounted on the frame of the vehicle with the stub shafts spaced forwardly of the half shafts. This is preferably accomplished in a manner in which the steering wheels of the vehicle can be turned so as to lie in front of the vehicle to significantly reduce the turning radius thereof. Moreover, the steering wheels are spaced sufficiently far from the sides of the vehicle to avoid contact with the sides of the vehicle during a turning maneuver.

With these features of construction, the drive mechanism of the present invention accomplishes the objects defined hereinabove.

BRIEF DESCRIPTION OF THE DRAWINGS

In the drawings:

FIG. 5 is a cross sectional view taken on the line 5—5 in FIG. 3B.

DETAILED DESCRIPTION OF THE PREFERRED EMBODIMENT

Figure 1:
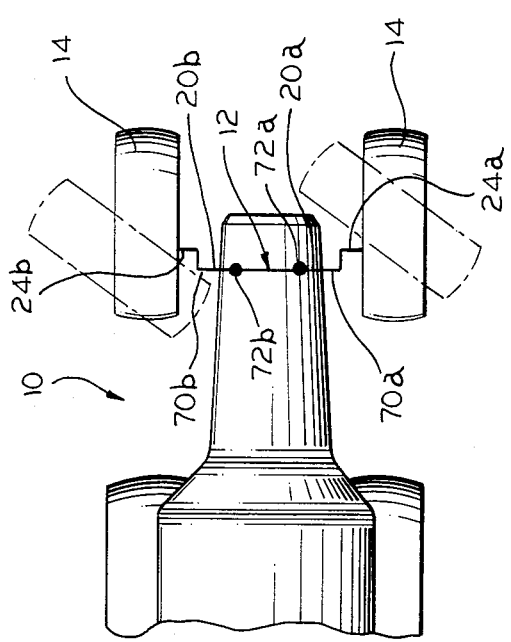
FIG. 1 is a schematic view of an all wheel drive for an agricultural tractor with front wheel steering in accordance with the present invention.

In the illustration given, and with reference first to FIG. 1, the reference numeral 10 designates generally an all wheel drive agricultural tractor having front wheel steering. The drive mechanism 12 for the steering wheels 14 include a housing 16 (see FIG. 2) adapted to be mounted on the frame of the tractor 10 (or other vehicle) and in conventional fashion (see phantom lines in FIG. 2) a differential gear 18 (see FIG. 3B) in the housing 16 adapted to be operatively connected to the drive shaft (not shown) of the tractor 10 (or other vehicle). A pair of half shafts 20a and 20b (see FIGS. 3A and 3B, respectively) are provided in the housing 16 operatively connected to the differential gear 18 and extend outwardly from the differential gear 18 in opposite directions with at least the inner portions 22a and 22b lying generally perpendicular to the vehicle drive shaft. A pair of stub shafts 24a and 24b are provided in the housing 16 operatively connected to the half shafts 20a and 20b and extend outwardly beyond the ends 26a and 26b of the half shafts 20a and 20b remote from the differential gear 18 generally parallel to and laterally spaced from the outer portions 28a and 28b of the half shafts 20a and 20b. The drive mechanism 12 for the steering wheels 14 also includes means for accommodating relative pivotal movement, such as the universal joints 30a and 30b, between the stub shafts 24a and 24b and at least a portion of the half shafts 20a and 20b. With this arrangement, the steering wheels 14 of the agricultural tractor 10 (or other vehicle) may be steered while being driven with the drive mechanism 12.

Figure 3A:
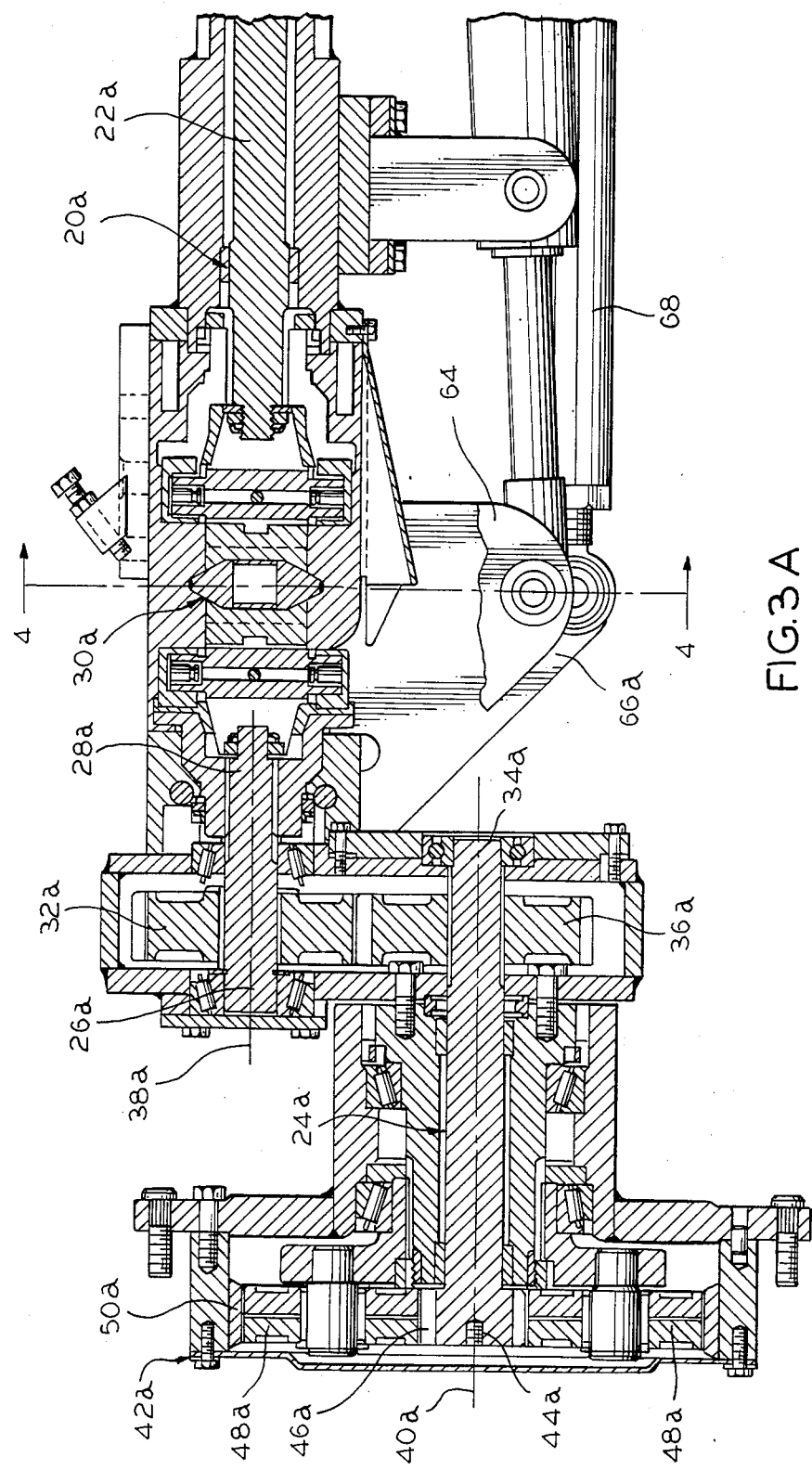
FIG. 3A is a cross sectional view of the portion of the drive mechanism to the left of the center line in FIG. 2.
Figure 3B:
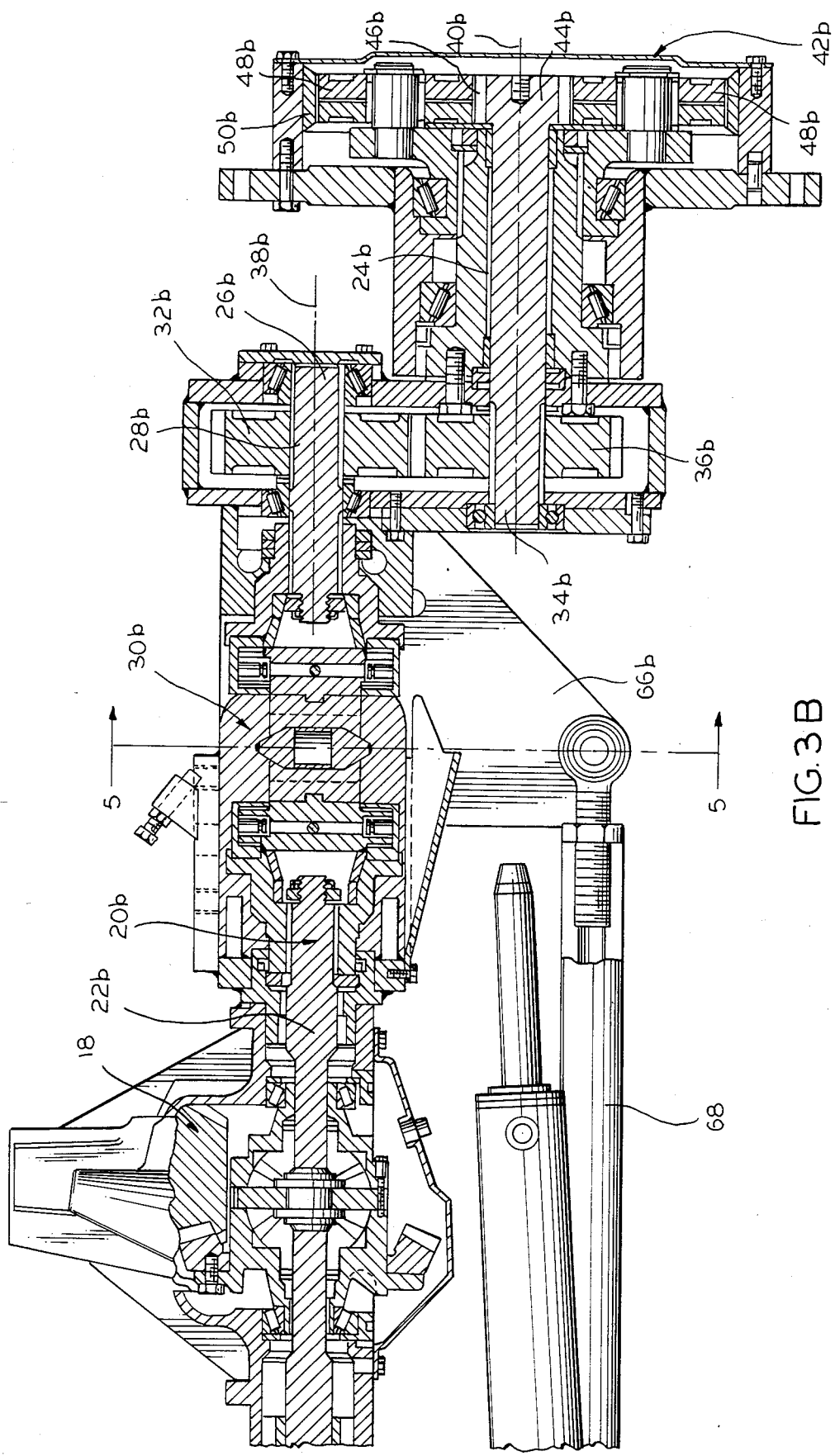
FIG. 3B is a cross sectional view of the portion of the drive mechanism to the right of the center line in FIG. 2.

Still referring to FIGS. 3A and 3B, the half shafts 20a and 20b each include a first portion and a second portion. The first portions comprise the inner portions 22a and 22b thereof and the second portions comprise the outer portions 28a and 28b thereof which are operatively connected to the stub shafts 24a and 24b. In addition, the second portions 28a and 28b are adapted to pivot relative to the first portions 22a and 22b.

More particularly, the universal joints 30a and 30b connect the first and second portions 22a, 22b and 28a, 28b, respectively, of the half shafts 20a and 20b. The universal joints 30a and 30b, as previously suggested, comprise at least a portion of the means for accommodating relative pivotal movement between the stub shafts 24a and 24b and at least a portion of the half shafts 20a and 20b, such as the first or inner portions 22a and 22b thereof. As will be appreciated, the second or outer portions 28a and 28b are adapted to pivot about the universal joints 30a and 30b with respect to the first portions 22a and 22b.

As shown, the second portions 28a and 28b of the half shafts 20a and 20b include drive gears 32a and 32b. The drive gears 32a and 32b are disposed near the outer ends 26a and 26b thereof. In addition, the inner ends 34a and 34b of the stub shafts 24a and 24b include driven gears 36a and 36b.

Still referring to FIGS. 3A and 3B, each of the drive gears 32a and 32b is disposed in a common plane with the corresponding driven gear 36a and 36b. Also, the second portions 28a and 28b of each of the half shafts 20a and 20b has an axis 38a and 38b lying in spaced parallel relation to the axis 40a and 40b of the corresponding stub shaft 24a and 24b. Moreover, the common planes defined by the drive gears and driven gears 28a, 36a and 28b, 36b, respectively, are disposed to lie generally perpendicular to the spaced parallel axes 38a, 40a and 38b, 40b, respectively.

Figure 2:
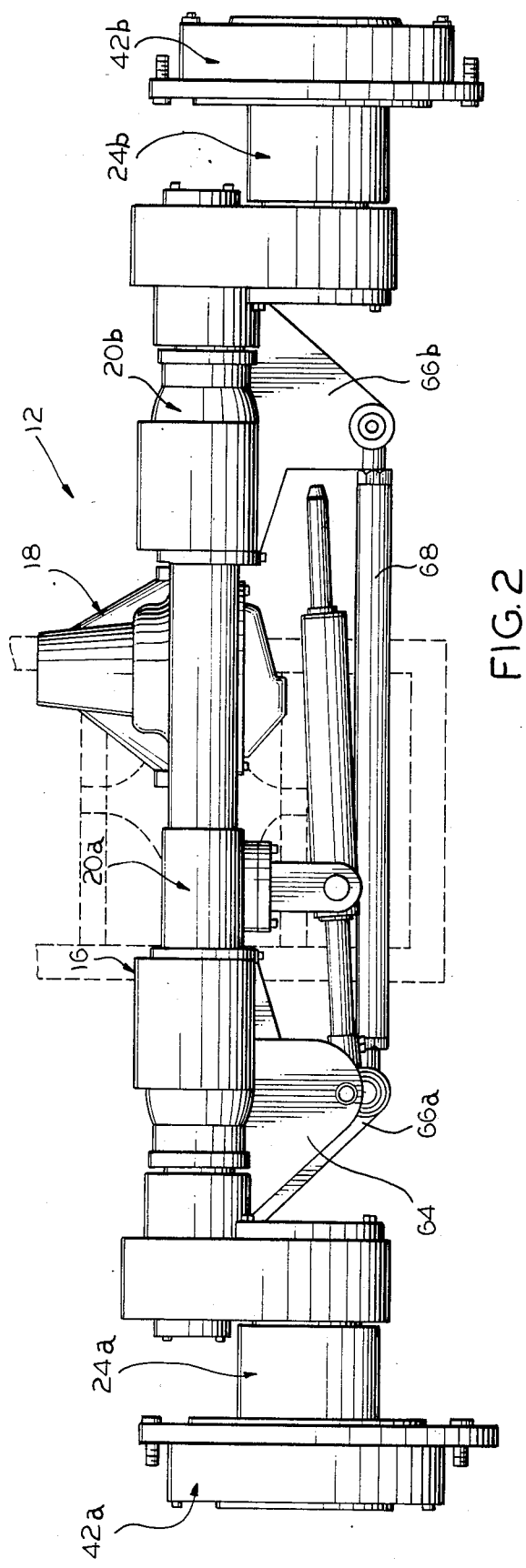
FIG. 2 is a plan view of the drive mechanism for the steering wheels of a vehicle in accordance with the present invention.

Referring to FIG. 2, a wheel hub 42a and 42b is disposed on the outer end 44a and 44b of each of the stub shafts 24a and 24b. The stub shafts 24a and 24b also each include a sun gear 46a and 46b on the outer end 44a and 44b thereof (see FIGS. 3A and 3B) adapted to drive a plurality of stationary planetary gears 48a and 48b disposed thereabout. In addition, the wheel hubs 42a and 42b each include a ring gear 50a and 50b driven by the planetary gears 48a and 48b affixed thereto.

As suggested by the schematic of FIG. 1, the housing 16 is adapted to be mounted on the frame of the tractor 10 (or other vehicle) with the stub shafts 24a and 24b spaced forwardly of the half shafts 20a and 20b. In addition, the steering wheels 14 of the tractor 10 (or other vehicle) are adapted to be turned so as to lie in front of the tractor 10 (or other vehicle) to reduce the turning radius thereof and, as shown, the steering wheels 14 are mounted on the stub shafts 24a and 24b outwardly beyond the sides of the tractor 10 (or other vehicle). Moreover, the steering wheels 14 are spaced sufficiently far from the sides of the tractor 10 (or other vehicle) to avoid contact during a turning maneuver with the sides thereof.

Figure 4:
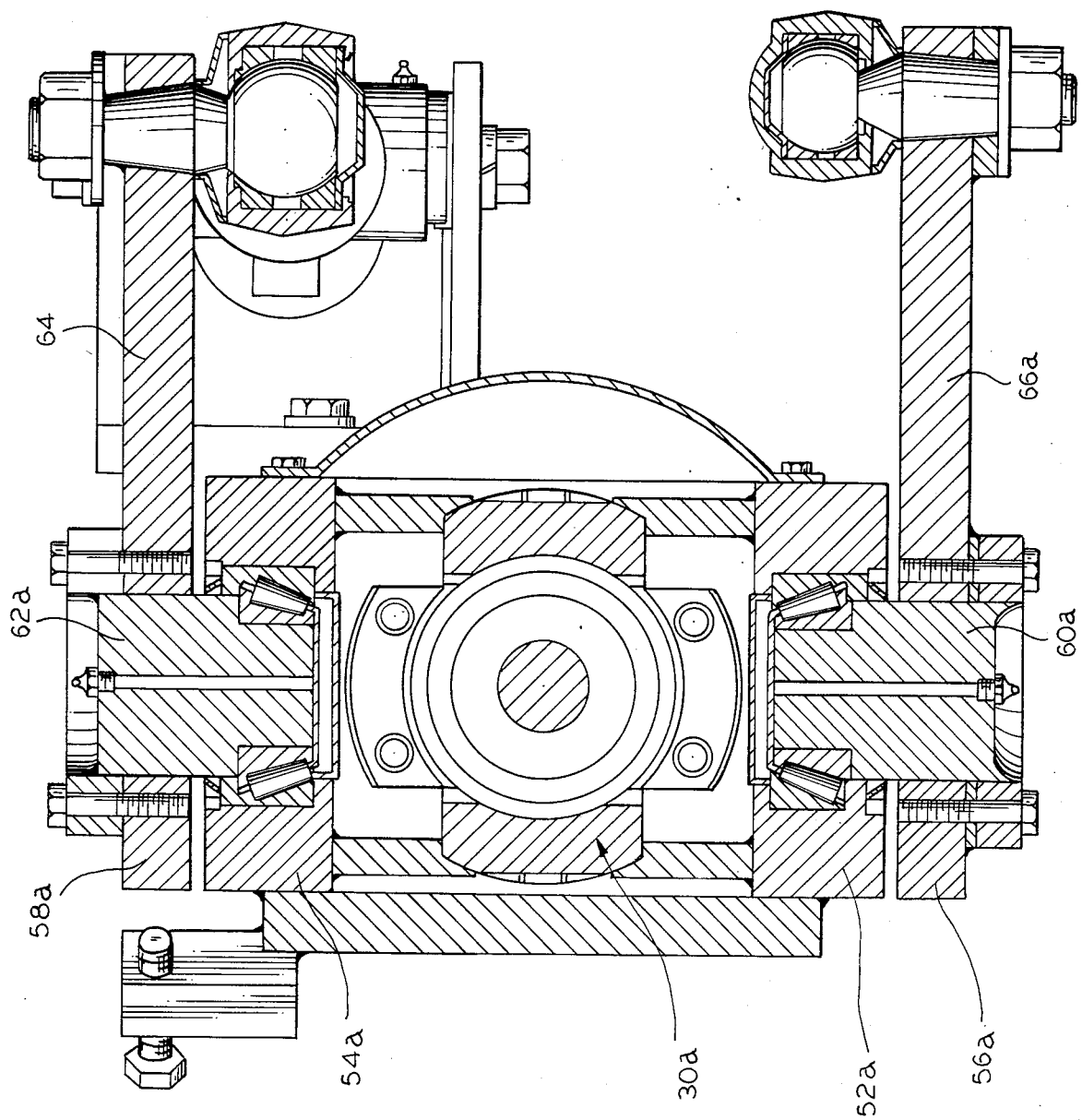
FIG. 4 is a cross sectional view taken on the line 4—4 in FIG. 3A.

Referring to FIGS. 2 through 4, the means for accommodating relative pivotal movement, in addition to the universal joints 30a and 30b, includes inner supporting members such as 52a and 54a and outer supporting members such as 56a and 58a joined by king pins such as 60a and 62a. It will also be seen that a steering arm 64 extends from one of the outer supporting members 58a. Referring to FIGS. 2 and 4, the outer supporting members such as 56a each further include a track arm 66a and 66b extending outwardly therefrom, and a track rod 68 joins the outward ends of the track arms 66a and 66b for simultaneous movement.

Referring to FIG. 1, it will be seen that the half shaft outer portions 28a and 28b, the drive and driven gears 32a, 36a and 32b, 36b, respectively, and the stub shafts 24a, 24b form generally Z-shaped configurations 70a and 70b adapted to pivot about pivot points 72a and 72b. The pivot points 72a and 72b correspond with the center of the universal joints 30a and 30b and, because the stub shafts 24a and 24b are laterally spaced forwardly of the half shafts 20a and 20b (see, e.g., FIG. 5) and extend outwardly by a considerable distance from the pivot points 72a and 72b which are disposed midway along the half shafts 20a and 20b, the steering wheels 14 are capable of being turned so as to lie in front of the tractor 10 (or other vehicle) while avoiding contact with the sides of the tractor 10 (or other vehicle) thereby reducing the turning radius during a turning maneuver. Simply stated, this is accomplished in a highly effective manner by forward lateral spacing of the stub shafts combined with the midway pivot point locations along the half shafts.

While the present invention is highly useful with many vehicles, it is particularly advantageous in all wheel drive agricultural tractors having front wheel steering. The construction of the drive mechanism or axle is such as to permit adjustment or variation of the tread setting between 60 inches and 88 inches to accommodate proper spacing for 22, 30, 34, 36, 38 and 42 inch rows with a short turning radius of under 12 feet with 50° steering at a 60 inch tread setting up to approximately 60° steering from 68 to 88 inch tread settings. Moreover, the present invention can accommodate 28 inch and 30 inch tires on the steering wheels for maximum traction and load carrying capacity.

Among other advantages of the present invention is the large diameter and slim width of the planetary gears for best crop clearance. Also, the drive mechanism preferably uses heavy duty, long life, low maintenance king pins; double lip, heavy duty seals; high quality, heat treated half shafts and stub shafts for higher torque capacity; balanced power gears in the differential for equal power delivery; helical hypoid drive ring gears and a slip yoke balanced drive shaft for quiet, long life operation; and hydraulic power steering for ease of operation. In addition, the drive mechanism is preferably designed with zero degree caster and zero degree camber for maximum pull with no wheel lean to lose traction.

While every detail illustrated in the drawings has not been described in order to avoid unnecessary confusion, the details necessary for a proper understanding of the inventive concept have been fully disclosed. Those skilled in the art will readily understand the details of construction and operation of the differential gear 18, the half shafts 20a and 20b, the stub shafts 24a and 24b, the universal joints 30a and 30b, the drive gears 32a and 32b, the driven gears 36a and 36b, the sun gears 46a and 46b, the planetary gears 48a and 48b, the ring gears 50a and 50b, as well as all of the other details of construction illustrated in the drawings. However, for purposes of aiding those studying the invention, sources for many of the components of a fully operational drive mechanism will now be set forth for the purpose of enhancement of understanding and not limitation.

In an operational prototype of the drive mechanism of the invention, the differential gear assembly is General Motors Corporation, Chevrolet Truck Division Part No. 14006457. It is also advantageous to use a universal joint assembly of the type manufactured and sold by Rockwell Corporation comprised of universal joint CP 58WB29, weld yoke 58WBY53-1, and end yoke 58WBYS28-3 and, among the various other parts or components, it is advantageous to use Torrington needle bearings and thrust washers, Timken tapered roller bearings, bearing locknuts and lockwashers, and shims, Fafnir ball bearings, Truarc snap rings, Chicago Rawhide oil seals, and Dixon bushings. With regard to the shaft and gears in the drive mechanism, they can be specially made to accommodate the loads to be encountered by a particular vehicle.

As will be appreciated, the present invention provides a unique drive mechanism for the steering wheels of a motorized vehicle resulting in a reduced turning radius. This is accomplished by reason of the lateral offset of the stub shafts relative to the half shafts combined with the location of the pivot point midway along the half shafts which cause the steering wheels to traverse a much longer circle or arc for the wheel pivoted to lie in front of the vehicle compared with the circle or arc of relative rearward movement of the opposite wheel, i.e., the steering wheel on the outside of the turn advances forward in a circle or arc by a greater distance than the steering wheel on the inside of the turn moves relatively rearwardly along a circle or arc during a turning maneuver. Because of this important advancement in drive mechanisms, the present invention can be utilized as an all wheel drive conversion unit or as an original equipment all wheel drive unit, and it is particularly well suited to provide all wheel drive for an agricultural tractor with front wheel steering.

Various changes coming within the spirit of the present invention may suggest themselves to those skilled in the art. Hence, it will be understood that the invention is not to be limited to the specific embodiments shown and described or the uses mentioned. On the contrary, the specific embodiment and uses are intended to be merely exemplary with the present invention being limited only by the true spirit and scope of the appended claims.

We claim:
1. A drive mechanism for the steering wheels of a vehicle, comprising:
   a housing adapted to be mounted on the frame of the vehicle;
   a differential gear in the housing adapted to be operatively connected to the drive shaft of the vehicle;
   a pair of half shafts in the housing operatively connected to the differential gear, the half shafts extending outwardly from the differential gear in opposite directions and having inner and outer portions joined for relative pivotal movement at approximately the midpoints thereof with the inner portions thereof having a common axis, the half shaft inner portions being adapted to lie generally perpendicular to the vehicle drive shaft;
   a pair of stub shafts in the housing operatively connected to the half shafts, the stub shafts having outer ends extending outwardly beyond the outer ends of the outer portions of the half shafts remote from the differential gear and being laterally spaced forwardly of the half shaft outer portions with the inner ends of the stub shafts being joined to the outer ends of the half shaft outer portions to form generally Z-shaped configurations, the stub shafts lying generally parallel to the half shaft outer portions;
   a pair of wheel hubs for the steering wheels operatively connected to the outer ends of the stub shafts remote from the differential gear; and
   means for accommodating relative pivotal movement at approximately the midpoints of the half shafts between the Z-shaped configurations and the inner portions of the half shafts;
   whereby the vehicle may be steered while being driven with the drive mechanism such that the steering wheel on the outside of the turn advances forward in an arc while the steering wheel on the inside of the turn advances rearward in an arc during a turning maneuver.

2. The drive mechanism as defined by claim 1 wherein the half shafts each include a first portion and a second portion, the first portions comprising the inner portions thereof and the second portions comprising the outer portions thereof and being operatively connected to the stub shafts, the second portions being adapted to pivot relative to the first portions.

3. The drive mechanism as defined by claim 2 including a universal joint connecting the first and second portions of each of the half shafts, the universal joints comprising at least a portion of the means for accommodating relative pivotal movement, the second portions being adapted to pivot about the universal joints with respect to the first portions.

4. The drive mechanism as defined by claim 3 wherein the second portions of the half shafts include drive gears, the drive gears being disposed near the outer ends thereof, and the inner ends of the stub shafts include driven gears.

5. The drive mechanism as defined by claim 4 wherein each drive gear is disposed in a common plane with the corresponding driven gear, the second portion of each half shaft having an axis lying in spaced parallel relation to the axis of the corresponding stub shaft, the common planes being disposed to lie generally perpendicular to the spaced parallel axes.

6. The drive mechanism as defined by claim 5 wherein the stub shafts each include a sun gear on the outer end thereof adapted to drive a plurality of stationary planetary gears disposed thereabout, the wheel hubs each including a ring gear driven by the planetary gears affixed thereto.

7. The drive mechanism as defined by claim 1 wherein the steering wheels of the vehicle are adapted to be turned so as to lie in front of the vehicle to reduce the turning radius thereof.

8. The drive mechanism as defined by claim 7 wherein the steering wheels are mounted on the stub shafts outwardly beyond the sides of the vehicle, the steering wheels being spaced sufficiently far from the sides of the vehicle to avoid contact with the sides of the vehicle during a turning maneuver.

9. The drive mechanism as defined by claim 1 wherein the means for accommodating relative pivotal movement includes inner supporting members and outer supporting members joined together by king pins, and including a steering arm on one of the outer supporting members joined to one of the king pins.

10. The drive mechanism as defined by claim 9 wherein the outer supporting members each include a track arm extending outwardly therefrom, the track arms each being joined to one of the king pins, and including a track rod joining the outward ends of the track arms for simultaneous movement thereof.

* * * * *